United States Patent
Lee et al.

(10) Patent No.: US 9,287,785 B2
(45) Date of Patent: Mar. 15, 2016

(54) VOLTAGE CONVERTING CONTROLLER, VOLTAGE CONVERTING CIRCUIT, AND CONTROL METHOD FOR VOLTAGE CONVERTING

(71) Applicant: RICHTEK TECHNOLOGY CORP, Hsinchu (TW)

(72) Inventors: Chuh Ching Lee, Hsinchu (TW); Chien-Fu Tang, Hsinchu (TW); Chun Shih Huang, Hsinchu (TW)

(73) Assignee: RICHTEK TECHNOLOGY CORP, Hsinchu (TW)

( * ) Notice: Subject to any disclaimer, the term of this patent is extended or adjusted under 35 U.S.C. 154(b) by 87 days.

(21) Appl. No.: 14/475,350

(22) Filed: Sep. 2, 2014

(65) Prior Publication Data

US 2015/0372599 A1     Dec. 24, 2015

(30) Foreign Application Priority Data

Jun. 19, 2014   (TW) .............................. 103121175 A

(51) Int. Cl.
*H02M 3/335*   (2006.01)
(52) U.S. Cl.
CPC ................................. *H02M 3/33507* (2013.01)
(58) Field of Classification Search
CPC ....................... H02M 3/33507; H02M 3/33523
USPC ............................................ 363/21.12–21.18
See application file for complete search history.

(56) References Cited

U.S. PATENT DOCUMENTS

| | | | | |
|---|---|---|---|---|
| 8,054,058 | B2 * | 11/2011 | Liu ...................... | H02M 3/1588 323/284 |
| 8,259,472 | B2 * | 9/2012 | Li ...................... | H02M 3/33507 363/21.12 |
| 8,780,590 | B2 * | 7/2014 | So ...................... | H02M 3/33507 363/21.16 |
| 8,811,045 | B2 * | 8/2014 | Ren ................... | H02M 3/33507 363/21.12 |

* cited by examiner

*Primary Examiner* — Timothy J Dole
*Assistant Examiner* — Htet Z Kyaw
(74) *Attorney, Agent, or Firm* — Chun-Ming Shih

(57) ABSTRACT

A voltage converting controller. When output current increases from a first current value to a second current value, the voltage converting controller temporarily sets a control frequency to a maximum frequency value. After a period of time, the voltage converting controller sets the control frequency to a target control frequency corresponding to the second current value. And, when the output current increases from the first current value to the second current value, the voltage converting controller temporarily sets a secondary-side output voltage to an transient output value; and after a period of time, the voltage converting controller sets a steady state value of the secondary-side output voltage to an output voltage steady state value corresponding to the second current value.

11 Claims, 5 Drawing Sheets

VOLTAGE CONVERTING CONTROLLER, VOLTAGE CONVERTING CIRCUIT, AND CONTROL METHOD FOR VOLTAGE CONVERTING

CROSS-REFERENCE TO RELATED APPLICATIONS

This non-provisional application claims priority claim under 35 U.S.C. §119(a) on Taiwan Patent Application No. 103121175 filed Jun. 19, 2014, the entire contents of which are hereby incorporated by reference.

BACKGROUND

1. Technical Field

This disclosure relates to a voltage converting controller, a voltage converting circuit, and a control method for voltage converting, and in particular, to a voltage converting controller, a voltage converting circuit, and a control method for voltage converting which can mitigate an overshoot and undershoot of an output voltage and may also have desirable power conversion efficiency when a heavy load and a light load frequently appear alternately.

2. Related Art

A switching voltage converting circuit is one of various voltage converting circuits, and in a manner of switching a power switch, regulates energy stored on an inductive component (for example, a transformer) to supply the energy to an output load, and converts an input voltage into an output voltage at an output end, so as to maintain a fixed output voltage value and provide a load current needed by the output load. Its advantage is that conversion efficiency is high, and therefore unnecessary heat generation can be reduced, thereby lowering complexity of a heat dissipation design.

On many electronic application apparatuses, for example, on a mobile phone, a load current supplied by a voltage converting circuit often involves an application scenario in which a heavy load and a light load frequently appear alternately. This is because at present an electronic application apparatus has an increasingly high integration level and increasingly complex functions; however, on the other hand, a requirement for electrical endurance of a system becomes increasingly high. Therefore, many functional blocks in an electronic system often quickly start and perform a function when needed, and switch off its power supply to save power. Therefore, for a system design of an electronic apparatus, a test of frequently switching a heavy load/light load of a power supply unit is more and more important, and becomes an important index for evaluating performance of the power supply unit.

In further description, at present, in designs of many switching voltage converting circuits, a positive correlation relationship exists between an operation frequency and the magnitude of a load current of the switching voltage converting circuit; that is, when the load current increases, an operation current also increases, and when the load current decreases, an operation current of the switching voltage converting circuit also decreases. This is because when the load current decreases and the output voltage is maintained by using a voltage stabilizing capacitor at an output end, its power loss speed is low, and therefore a low operation frequency may be used without making the output voltage too low; meanwhile, a switching loss may be reduced, which helps to improve power conversion efficiency of the switching voltage converting circuit, that is, can improve endurance of a battery. However, when the operation frequency is low, and the load current transiently changes from a light load to a heavy load, electric charge needed by the load can be transiently supplied only by the voltage stabilizing capacitor at the output end, until a next operation frequency period starts. Therefore, the output voltage possibly causes a severe undershoot, and even causes abnormal work of a circuit.

Please refer to U.S. Pat. No. 8,259,472 (hereinafter referred to as '472). '472 discloses a switching voltage converting circuit, of which an operation frequency and the magnitude of a load current are positively correlated. A technical solution of '472 further includes a minimum transient frequency, and when the magnitude of the load current changes from a heavy load to a light load, the operation frequency also gradually decreases. However, in a process in which the operation frequency decreases, when a frequency of the operation frequency is already equal to the minimum transient frequency, the switching voltage converting circuit disclosed by '472 makes the frequency of the operation frequency fixed at the minimum transient frequency for a certain period of time, during which, if the load current changes from a light load to a heavy load, an undershoot of an output voltage can be made not too severe because the frequency of the operation frequency is high enough. In summary, after the frequency of the operation frequency has been fixed at the minimum transient frequency for a certain period of time, if a condition in which a load current changes from a light load to a heavy load does not occur, the operation frequency is no longer maintained at the minimum transient frequency, and an original mechanism is restored to continue with being corresponding to a frequency change of the light load.

However, in '472, when a heavy load and a light load frequently appear alternately, the frequency of the operation frequency is maintained above the minimum transient frequency, resulting in a sacrifice of power conversion efficiency.

SUMMARY

To solve the foregoing problem, this disclosure mainly provides a voltage converting controller, a voltage converting circuit, and a control method for voltage converting, which can mitigate an overshoot and undershoot of an output voltage and may also have desirable power conversion efficiency when a heavy load and a light load frequently appear alternately.

This disclosure provides a voltage converting controller, which is applied to a switching voltage converting circuit to convert an input voltage into a regulated secondary-side output voltage.

The switching voltage converting circuit further includes a primary coil, a secondary coil, and a switch. The primary coil is coupled to an input terminal and receives the input voltage. The secondary coil is coupled to a secondary-side output terminal and outputs the secondary-side output voltage, and an output current is provided on the secondary-side output terminal. The switch is coupled to the primary coil; when the switch is turned on, a current is generated on the primary coil; and when the switch is turned off, and no current is generated on the primary coil.

The voltage converting controller generates a control signal. The control signal has a variable control frequency to separately and periodically control the switch to be turned on or off by using a first state and a second state, and the control frequency is positively correlated to the output current. When the output current increases from a first current value to a second current value, the voltage converting controller starts a transient reaction period, and sets the control frequency to a maximum frequency value. When the transient reaction period ends, the voltage converting controller sets the control frequency to a target control frequency corresponding to the second current value.

Further, this disclosure further provides a voltage converting controller, applied to a switching voltage converting circuit to convert an input voltage into a regulated secondary-side output voltage.

The switching voltage converting circuit further includes a primary coil, a secondary coil, and a switch. The primary coil is coupled to an input terminal and receives the input voltage. The secondary coil is coupled to a secondary-side output terminal and outputs the secondary-side output voltage, and an output current is provided on the secondary-side output terminal. The switch is coupled to the primary coil, and when the switch is turned on, a current is generated on the primary coil, and when the switch is turned off, no current is generated on the primary coil.

A steady state value of the secondary-side output voltage is positively correlated to the output current. When the output current increases from a first current value to a second current value, the voltage converting controller starts a dynamic reaction period, and sets the secondary-side output voltage to an transient output value; and when the dynamic reaction period ends, the voltage converting controller sets the steady state value of the secondary-side output voltage to an output voltage steady state value corresponding to the second current value.

Further, this disclosure further provides a switching voltage converting circuit, which has a circuit configuration and an operation manner same as those of the switching voltage converting circuit to which the voltage converting controller disclosed above is applied.

In an embodiment of this disclosure, the switching voltage converting circuit further includes a conducting wire, one end of the conducting wire is coupled to a secondary-side output terminal, and the other end of the conducting wire is a conducting wire output end and has a conducting wire output voltage. The voltage converting controller further includes a conducting wire compensation unit, for maintaining a steady state value of the conducting wire output voltage at a fixed value by controlling the steady state value of the secondary-side output voltage. When the voltage converting controller is in the dynamic reaction period, the voltage converting controller turns off a function of the conducting wire compensation unit.

Further, this disclosure further provides a control method for voltage converting, applied to a switching voltage converting circuit. The switching voltage converting circuit converts an input voltage into a regulated secondary-side output voltage. A voltage converting controller generates a control signal, and the control signal has a variable control frequency to separately and periodically control a switch to be turned on or off by using a first state and a second state.

The control method includes the following steps:

Detecting an output current of the switching voltage converting circuit;

When the output current of the switching voltage converting circuit increases from a first current value to a second current value, starting an transient reaction period and setting the control frequency to a maximum frequency value; and When the transient reaction period ends, setting the control frequency to an output control frequency corresponding to the second current value.

Further, this disclosure further provides a control method for voltage converting, applied to a switching voltage converting circuit. The switching voltage converting circuit converts an input voltage into a regulated secondary-side output voltage.

The control method includes the following steps:

Detecting an output current of the switching voltage converting circuit;

When the output current of the switching voltage converting circuit increases from a first current value to a second current value, starting a dynamic reaction period, and setting the secondary-side output voltage to an transient output value; and When the dynamic reaction period ends, setting a steady state value of the secondary-side output voltage to an output voltage steady state value corresponding to the second current value.

In an embodiment of this disclosure, the switching voltage converting circuit has a primary-side regulation (PSR) configuration.

In this disclosure, a frequency of an operation frequency and a level of a secondary-side output voltage at a front end of a conducting wire are set when it is detected that a load current transiently changes from a light load to a heavy load, so that when a heavy load and a light load of the output current frequently appear alternately, an overshoot and undershoot of an output voltage at a rear end of the conducting wire can be mitigated, the quality of the output voltage can be improved, and at the same time, the voltage converting circuit may have desirable power conversion efficiency.

The features, implementations, and efficacy of the present creation are described below in detail with reference to the accompanying drawings and the optimal embodiments.

DETAILED DESCRIPTION

In this disclosure, the term "couple" herein includes any direct and indirect electrical connection means. Therefore, if it is described herein that a first apparatus is coupled to a second apparatus, it represents that the first apparatus may be electrically connected to the second apparatus directly, or electrically connected to the second apparatus indirectly by using another apparatus or connection means.

Figure 1:
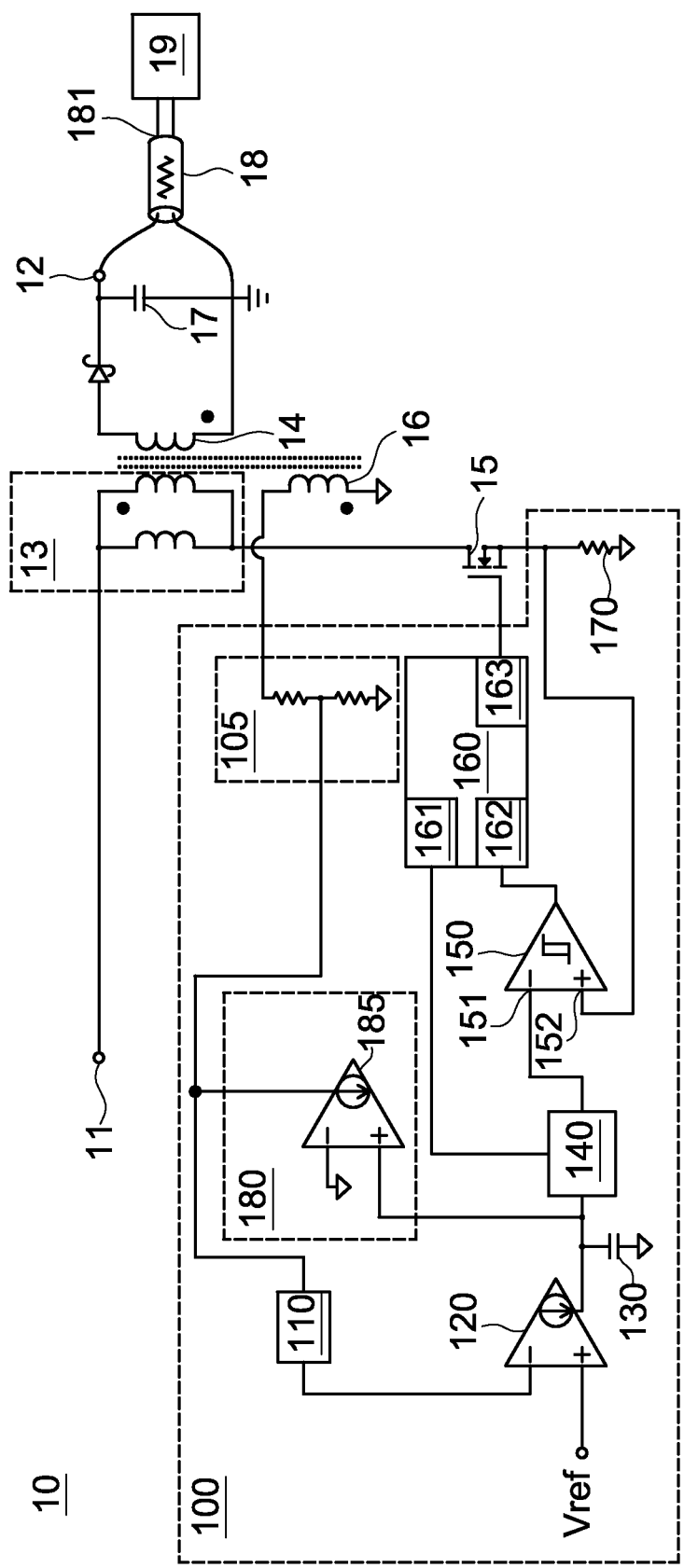
FIG. 1 is a circuit diagram of a voltage converting controller and a switching voltage converting circuit to which the voltage converting controller is applied, which are disclosed by this disclosure.

FIG. 1 is a circuit diagram of a voltage converting controller 100 and a switching voltage converting circuit 10 to which the voltage converting controller 100 is applied, which are disclosed by this disclosure.

The switching voltage converting circuit 10 converts an input voltage into a regulated secondary-side output voltage.

The switching voltage converting circuit 10 further includes a primary coil 13, a secondary coil 14, and a switch 15.

The primary coil 13 is coupled to an input terminal 11 and receives the input voltage. The secondary coil 14 is coupled to a secondary-side output terminal 12 and outputs the secondary-side output voltage. An output current is provided on the secondary-side output terminal 12.

The switch 15 is coupled to the primary coil 13. When the switch 15 is turned on, a current is generated on the primary coil 13. When the switch 15 is turned off, no current is generated on the primary coil 13. The voltage converting controller 100 generates a control signal. The control signal has a variable control frequency to separately and periodically control the switch 15 to be turned on or off by using a first state and a second state, and the control frequency is positively correlated to the output current.

When the output current increases from a first current value to a second current value, the voltage converting controller 100 starts an transient reaction period, and sets the control frequency to a maximum frequency value.

When the transient reaction period ends, the voltage converting controller 100 sets the control frequency to a target control frequency corresponding to the second current value.

For example, the voltage converting controller 100 in FIG. 1 may further include a resistor voltage division circuit 105, a sample holding unit 110, a voltage-controlled current source amplifier 120, a loop capacitor 130, a control unit 140, a comparator 150, and a D-type flip-flop 160.

The switching voltage converting circuit 10 may further include a tertiary-side coil 16. A coupling inductance exists between the primary coil 13, the secondary coil 14, and the tertiary-side coil 16. Therefore, when the secondary coil 14 and the secondary-side output terminal 12 form a current loop, the tertiary-side coil 16 also has an induced current magnitude. And the tertiary-side coil 16 forms, at a voltage division output point of the resistor voltage division circuit 105, an induced voltage directly proportional to a transient value of the secondary-side output voltage.

After the induced voltage is sampled by the subsequent sample holding unit 110, a transient condition of a current secondary-side output voltage may be determined. The sample holding unit 110 outputs a voltage directly proportional to a transient peak value of the secondary-side output voltage, and compares the output voltage and a reference voltage Vref. A difference between the output voltage and the reference voltage Vref enables the voltage-controlled current source amplifier 120 to output a current directly proportional to the difference, and implements, by charging and discharging the loop capacitor 130, a function of integration. A voltage on the loop capacitor 130 traces, at a certain speed, a change of the magnitude of the output current.

When the output current is a fixed value, the voltage on the loop capacitor 130 may represent the magnitude of the output current. The control unit 140 outputs two signals according to the voltage on the loop capacitor 130: one is an operation frequency of the voltage converting controller 100, and a control frequency of the operation frequency is positively correlated to the output current; the other is a comparison voltage directly proportional to the voltage on the loop capacitor 130, and the comparison voltage is input to a negative input 151 of the comparator 150.

The operation frequency is connected to a set input terminal 161 of the D-type flip-flop 160, so that an output end 163 of the D-type flip-flop 160 outputs a signal in the first state to control a channel of the switch 15 to be turned on, and form a voltage on the induced current resistor 170 and input the formed voltage as a feedback to a positive input 152 of the comparator 150. A voltage of the positive input 152 increases as a current that flows through the switch 15 increases, and finally enables a transition of an output of the comparator 150. An output end 153 of the comparator 150 is connected to a reset input terminal 162 of the D-type flip-flop 160. When the output of the comparator 150 transitions, the output end 163 of the D-type flip-flop 160 outputs a signal in the second state, so that the channel of the switch 15 is turned off. A signal on the output end 163 is the foregoing control signal.

It should be noted that, the voltage converting controller 100 described in the former paragraph is used as an explanatory example, but is not used to limit the scope of this disclosure. Persons of ordinary skill in the art may implement this disclosure according to the spirit disclosed by this disclosure in light of different application situations of this disclosure. Reference may be made to many other conventional technologies for the voltage converting controller 100. Therefore, detailed operations or other implementation manners of the voltage converting controller 100 are no longer elaborated herein.

In further description, when the output current increases from the first current value to the second current value, an transient large drop of the secondary-side output voltage occurs, which is reflected in the induced voltage and the sample holding unit 110. When a signal sampled by the sample holding unit 110 is less than a set value, it is determined that a condition in which the output current changes from a light load to a heavy load occurs, and the control unit 140 is informed. In this case, the control unit 140 starts an transient reaction period, and sets the control frequency to a maximum frequency value, so that the switching voltage converting circuit 10 can provide, at a fast reaction speed, the output current needed by the load, and charge the voltage stabilizing capacitor 17 on the secondary-side output terminal 12, so as to restore the secondary-side output voltage to a rated value as soon as possible. For the length of the transient reaction period, in terms of design, a design rule is that after instantaneousness occurs, the switching voltage converting circuit 10 can achieve stable supply for the output current of the second current value. After the transient reaction period ends, the voltage converting controller 100 sets the control frequency to a target control frequency corresponding to the second current value.

Figure 2:
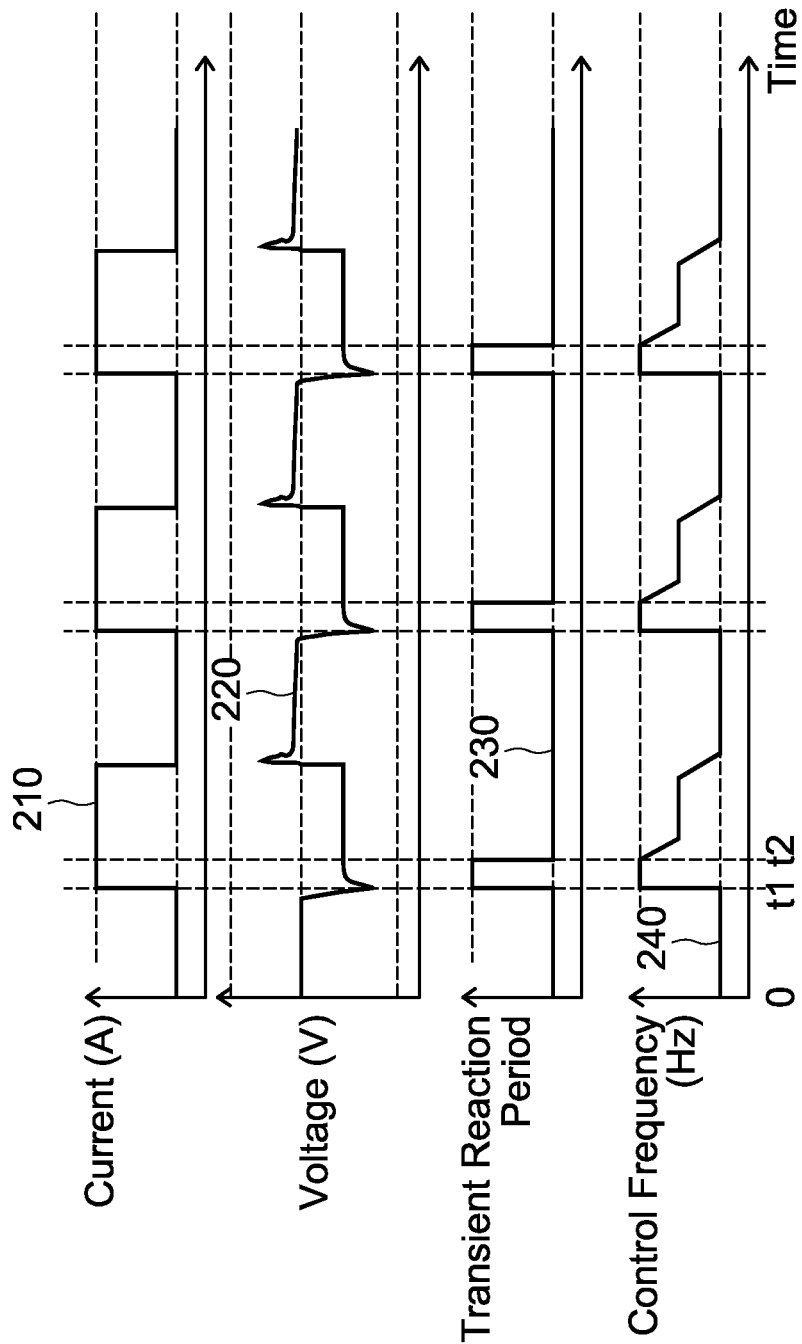
FIG. 2 is a relevant waveform diagram of a voltage converting controller and a switching voltage converting circuit to which the voltage converting controller is applied, which are disclosed by this disclosure.

FIG. 2 is a relevant waveform diagram of the foregoing reaction mechanism. A waveform 210 is the output current, a waveform 220 is the secondary-side output voltage, a waveform 230 is an indication signal of the transient reaction period, and a waveform 240 is the control frequency of the operation frequency. As shown in FIG. 2, the waveform 210 shows that the output current frequently alternates between a light load and a heavy load of the first current value and the second current value. In the waveform 210, when the first current value increases to the second current value at time t1, the waveform 220 shows that the secondary-side output voltage greatly drops transiently, and the transient reaction period is started as shown in the waveform 230. In this case, as shown in the waveform 240, when the control frequency is set to the maximum frequency value, the switching voltage converting circuit 10 can provide, at a fast speed, the output current needed by the load, and charge the voltage stabilizing capacitor 17 on the secondary-side output terminal 12. Therefore, as shown in the waveform 220, the secondary-side output voltage is restored to a stable value as soon as possible. Next, at time t2, as shown in the waveform 230, the transient reaction period ends. In this case, as shown in the waveform 240, the voltage converting controller 100 sets the control frequency to a target control frequency corresponding to the second current value. The length of the transient reaction period is in an order of magnitude of about 10 microseconds and therefore too much additional power consumption loss on the voltage converting controller is avoided. Therefore, the switching voltage converting circuit 10 disclosed by this disclosure can still maintain desirable power conversion efficiency.

In addition, in the voltage converting controller 100 and the switching voltage converting circuit 10 to which the voltage converting controller 100 is applied, which are disclosed in FIG. 1, when the output current increases from the first current value to the second current value, the voltage converting controller 100 may start a dynamic reaction period, and set the secondary-side output voltage to the transient output value; and when the dynamic reaction period ends, the voltage converting controller 100 sets the steady state value of the secondary-side output voltage to an output voltage steady state value corresponding to the second current value.

For example, as shown in FIG. 1, the switching voltage converting circuit 10 further includes a conducting wire 18, where one end of the conducting wire 18 is coupled to the secondary-side output terminal 12, and the other end of the conducting wire 18 is a conducting wire output end 181 and has the conducting wire output voltage to supply power to a load 19. The voltage converting controller 100 further includes a conducting wire compensation unit 180, for maintaining a steady state value of the conducting wire output voltage at a fixed value by controlling the steady state value of the secondary-side output voltage. When the voltage converting controller 100 is in the dynamic reaction period, the voltage converting controller 100 turns off a function of the conducting wire compensation unit 180.

In further description, as shown in FIG. 1, the conducting wire compensation unit 180 may further include a compensation voltage-controlled current source 185, a positive input terminal and a negative input terminal of which are coupled to an output end and a grounding end of the voltage-controlled current source amplifier 120 respectively, and the output current is coupled to the voltage division output point of the resistor voltage division circuit 105 in a manner of a sink current. As described above, the voltage on the loop capacitor 130, that is, an output end voltage of the voltage-controlled current source amplifier 120, traces, at a certain speed, the change of the magnitude of the output current. Therefore, when the output current is relatively large, the compensation voltage-controlled current source 185 generates a large sink current, which causes the secondary-side output voltage to be high to compensate for a large voltage drop caused by the relatively large output current of the conducting wire 18, so as to further maintain the steady state value of the conducting wire output voltage at a fixed value.

However, the behavior that the conducting wire compensation unit 180 compensates for the voltage drop of the conducting wire 18 is not beneficial to an overshoot phenomenon that occurs on the conducting wire output voltage when the output current changes from a heavy load to a light load. Furthermore, when the output current is a light load, if the conducting wire output voltage can be set to a level that is lower than a rated value, on the contrary, when the output current changes from a heavy load to a light load, the overshoot phenomenon of the conducting wire output voltage has a large margin, so that the conducting wire output voltage does not exceed a specification range. Therefore, in the foregoing description example, when the voltage converting controller 100 is in the dynamic reaction period, it is predicted that next a condition in which the output current changes from a heavy load to a light load may occur, and therefore the function of the conducting wire compensation unit 180 is temporarily turned off. In this case, the steady state value of the secondary-side output voltage is regulated to an original rated value, but the conducting wire output voltage is at a lower level due to the voltage drop on the conducting wire 18, which facilitates occurrence of the output current changing from a heavy load to a light load.

It should be noted that, the foregoing implementation of this disclosure by turning off the function of the conducting wire compensation unit 180 is only used as the description example, and is not used to limit the scope of this disclosure. Persons of ordinary skill in the art may all implement this disclosure according to the spirit disclosed by this disclosure in light of different application situations of this disclosure. Therefore, other embodiments are no longer elaborated herein.

Figure 3:
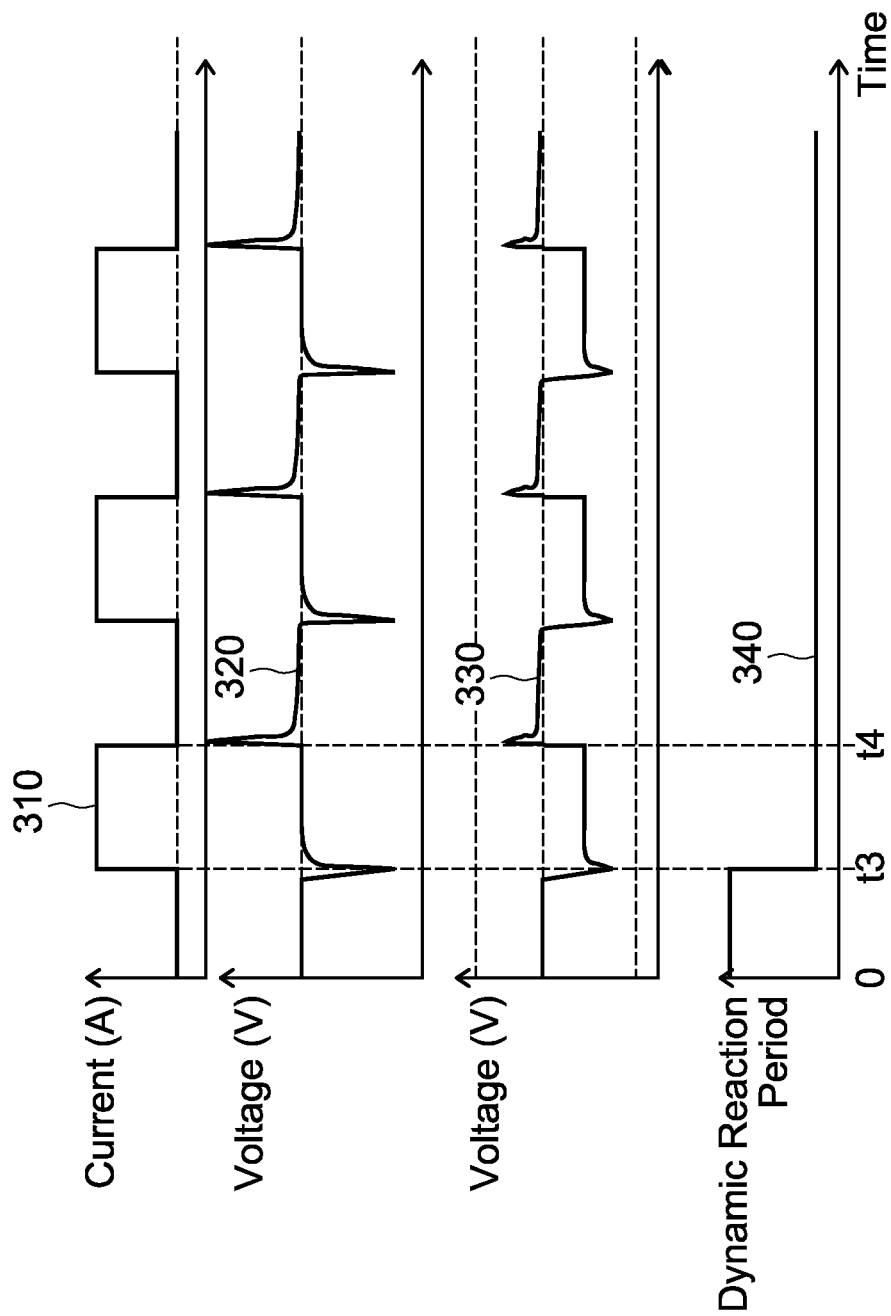
FIG. 3 is another relevant waveform diagram of a voltage converting controller and a switching voltage converting circuit to which the voltage converting controller is applied, which are disclosed by this disclosure.

FIG. 3 is a relevant waveform diagram of the foregoing reaction mechanism. A waveform 310 is the output current, a waveform 320 is the secondary-side output voltage, a waveform 330 is the conducting wire output voltage, and a waveform 340 is an indication signal of the dynamic reaction period. As shown in FIG. 3, the waveform 310 shows that the output current frequently alternates between a light load and a heavy load of the first current value and the second current value. In the waveform 310, when the first current value increases to the second current value at time t3, the waveform 340 shows that the dynamic reaction period starts. Therefore, as shown in the waveform 320, the secondary-side output voltage is set to the transient output value, for example, the function of the conducting wire compensation unit 180 is turned off, and the secondary-side output voltage is maintained at the original rated value. In this case, as shown in the waveform 330, the conducting wire output voltage is at a low level due to the voltage drop on the conducting wire 18. Subsequently, at time t4, when the output current decreases from the second current value to the first current value, as shown in the waveform 330, although the overshoot phenomenon occurs on the conducting wire output voltage, with a relatively large margin, the conducting wire output voltage does not exceed the specification range.

In addition, as shown in FIG. 3, a condition in which a light load changes to a heavy load keeps happening, and therefore the dynamic reaction period does not show a time point at which the change ends. However, persons of ordinary skill in the art may directly and unequivocally learn from the foregoing relevant description that, the length of the dynamic reaction period may be designed according to different application conditions. For example, in an application, when the output current changes from a light load to a heavy load, how long later a condition in which a heavy load changes to a light load is expected to occur may be learned from system analysis; and the dynamic reaction period is designed to be not shorter than this time, so as to mitigate a condition of an overshoot of an output voltage.

It should be noted that, it may be known from the embodiment disclosed in FIG. 1 that, the switching voltage converting circuit has a PSR configuration, that is, a feedback signal of the switching voltage converting circuit is completely not from a relevant end point of a secondary side; therefore, when electrical coupling between a primary side and the secondary side is effectively isolated, a component, for example, a common optical coupling component, needed for feedback from the secondary side to the primary side may be omitted, thereby effectively saving cost. However, a relevant signal of an output side is lacked for feedback control, and therefore, for a transient condition excited by the output side, for example, a change of the output current, and transient response for the transient condition is often undesirable. Therefore, the voltage converting controller and the voltage converting circuit disclosed by this disclosure can especially help to improve a transient response caused by a change of an output current of a PSR configuration.

In addition, as disclosed in this disclosure, when the output current changes from a light load to a heavy load, a condition of setting the control frequency to the maximum frequency value to mitigate an undershoot of an output voltage, and a condition of setting the secondary-side output voltage to the transient output value to mitigate an overshoot of an output voltage, may be used as two separate technical solutions, one of which may be selected to be applied to a same voltage converting circuit, and this disclosure is not limited to a simultaneous implementation of the two solutions. Persons of ordinary skill in the art may, according to different application situations, use the foregoing two technical solutions in combination with various different specific implementation manners to achieve an optimized design solution through a compromise between cost and circuit performance.

Figure 4:
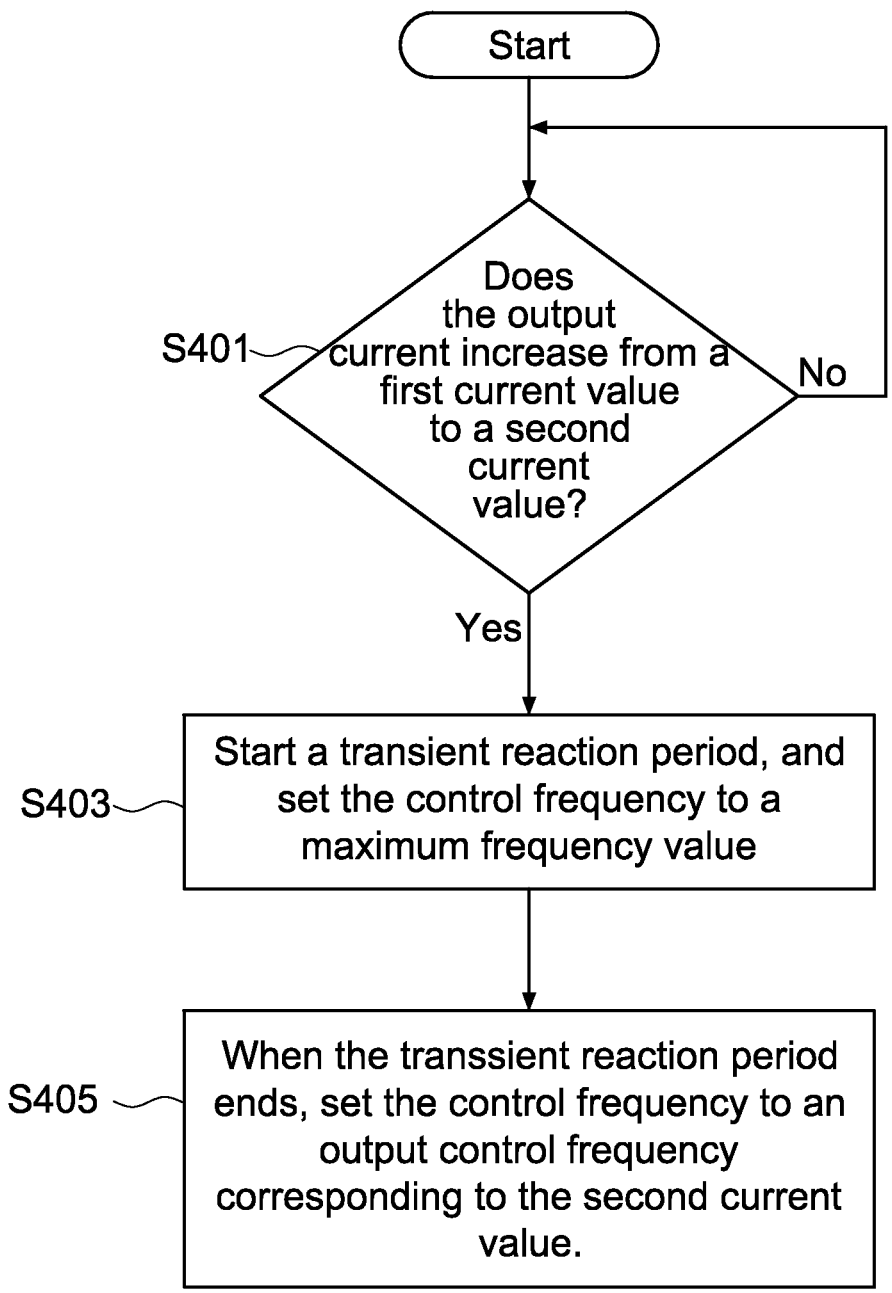
FIG. 4 is a step flowchart of a control method for voltage converting disclosed by this disclosure.

FIG. 4 is a step flowchart of a control method for voltage converting disclosed by this disclosure, which is applied to a switching voltage converting circuit. The switching voltage converting circuit converts an input voltage into a regulated secondary-side output voltage. The voltage converting controller generates a control signal, and the control signal has a variable control frequency to separately and periodically control a switch to be turned on or off by using a first state and a second state. The control method includes the following steps.

As shown in Step S401, the switching voltage converting circuit detects an output current of the switching voltage converting circuit. When the output current of the switching voltage converting circuit increases from a first current value to a second current value, the process turns to Step S403.

As shown in Step S403, the switching voltage converting circuit starts a transient reaction period, and sets the control frequency to a maximum frequency value.

As shown in Step S405, when the transient reaction period ends, the switching voltage converting circuit sets the control frequency to an output control frequency corresponding to the second current value.

For the control method for voltage converting disclosed in the foregoing, an undershoot phenomenon of an output voltage caused when an output current of a switching voltage converting circuit changes from a light load to a heavy load can be desirably mitigated. For relevant description, reference may be made to the foregoing combined description about FIG. 1 and FIG. 2, which is no longer elaborated herein.

Figure 5:
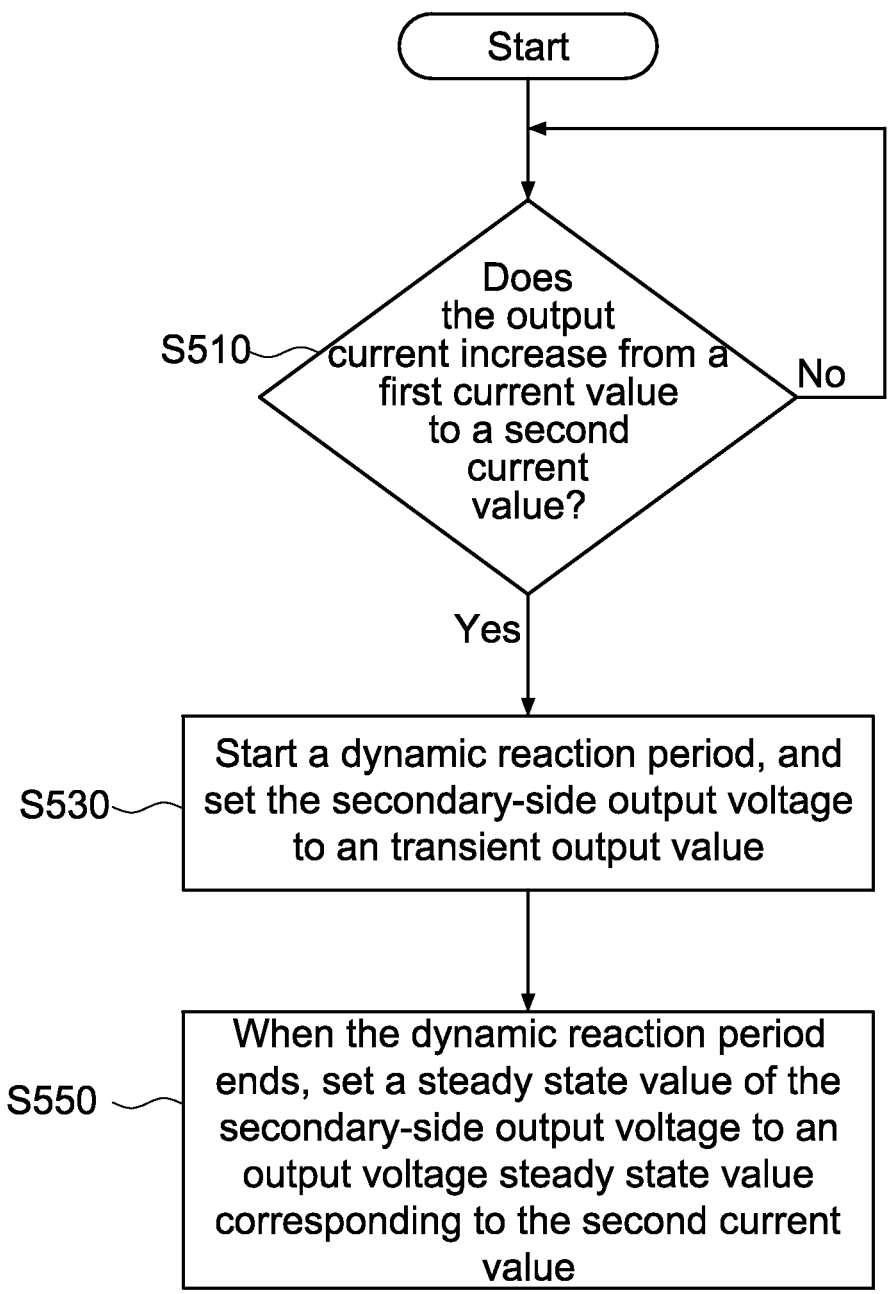
FIG. 5 is a step flowchart of another control method for voltage converting disclosed by this disclosure.

FIG. 5 is a step flowchart of another control method for voltage converting disclosed by this disclosure, which is applied to a switching voltage converting circuit. The switching voltage converting circuit converts an input voltage into a regulated secondary-side output voltage, and the control method includes the following steps.

As shown in Step S510, the switching voltage converting circuit detects an output current of the switching voltage converting circuit. When the output current of the switching voltage converting circuit increases from a first current value to a second current value, the process turns to Step S530.

As shown in Step S530, the switching voltage converting circuit starts a dynamic reaction period, and sets the secondary-side output voltage to a transient output value.

As shown in Step S550, when the dynamic reaction period ends, the switching voltage converting circuit sets a steady state value of the secondary-side output voltage to an output voltage steady state value corresponding to the second current value.

For the control method for voltage converting disclosed in the foregoing, an overshoot phenomenon of an output voltage caused when an output current of a switching voltage converting circuit changes from a heavy load to a light load can be desirably mitigated. For relevant description, reference may be made to the foregoing combined description about FIG. 1 and FIG. 3, which is no longer elaborated herein.

In addition, for the two control methods for voltage converting disclosed above, this disclosure is not limited to the selection of either only for a separate implementation on a same switching voltage converting circuit. That is, the two methods may be selected for a simultaneous implementation on the control of a same switching voltage converting circuit, so as to mitigate an overshoot phenomenon and an undershoot phenomenon of an output voltage caused by transient of an output current at the same time. After fully understanding the spirit disclosed by this disclosure and relevant implementation manners of all the foregoing description examples, persons of ordinary skill in the art should be able to directly implement this disclosure according to different applications and specification requirements of this disclosure.

Though the embodiments of this disclosure are disclosed above, the embodiments are not used for limiting this disclosure; several variations can be made according to the shapes, structures, features, and quantity described in the application scope of this disclosure by persons skilled in the art without departing from the spirit and scope of this disclosure, and therefore, the patent protection scope of this disclosure shall be as defined in the appended claims of the specification.

What is claimed is:

1. A voltage converting controller, applied to a switching voltage converting circuit to convert an input voltage into a regulated secondary-side output voltage, wherein the switching voltage converting circuit further comprises a primary coil, a secondary coil, and a switch; the primary coil is coupled to an input terminal and receives the input voltage; the secondary coil is coupled to a secondary-side output terminal and outputs the secondary-side output voltage, and an output current is provided on the secondary-side output terminal; the switch is coupled to the primary coil, and when the switch is turned on, a current is generated on the primary coil; when the switch is turned off, no current is generated on the primary coil; and the voltage converting controller generates a control signal, and the control signal has a variable control frequency to separately and periodically control the switch to be turned on or off by using a first state and a second state; and the control frequency is positively correlated to the output current;

wherein, when the output current increases from a first current value to a second current value, the voltage converting controller starts a transient reaction period, and sets the control frequency to a maximum frequency value; and when the transient reaction period ends, the voltage converting controller sets the control frequency to a target control frequency corresponding to the second current value.

2. The voltage converting controller as claimed in claim 1, wherein, when the output current increases from the first current value to the second current value, the voltage converting controller starts a dynamic reaction period, and sets the secondary-side output voltage to an transient output value; and when the dynamic reaction period ends, the voltage converting controller sets a steady state value of the secondary-side output voltage to an output voltage steady state value corresponding to the second current value.

3. The voltage converting controller as claimed in claim 1, wherein, the switching voltage converting circuit further comprises a conducting wire, one end of the conducting wire is coupled to the secondary-side output terminal, and the other end of the conducting wire is a conducting wire output end and has a conducting wire output voltage; and the voltage converting controller further comprises a conducting wire compensation unit, for maintaining a steady state value of the conducting wire output voltage at a fixed value by controlling the steady state value of the secondary-side output voltage, and when the voltage converting controller is in the dynamic reaction period, the voltage converting controller turns off a function of the conducting wire compensation unit.

4. The voltage converting controller as claimed in claim 1, wherein the switching voltage converting circuit has a primary-side regulation configuration.

5. A switching voltage converting circuit, used to convert an input voltage into a regulated secondary-side output voltage, wherein the switching voltage converting circuit comprises:
- a primary coil, coupled to an input terminal and receiving the input voltage;
- a secondary coil, coupled to a secondary-side output terminal and outputting the secondary-side output voltage, wherein an output current is provided on the secondary-side output terminal;
- a switch, coupled to the primary coil; wherein when the switch is turned on, a current is generated on the primary coil, and when the switch is turned off, no current is generated on the primary coil; and
- a voltage converting controller, generating a control signal, wherein the control signal has a variable control frequency to separately and periodically control the switch to be turned on or off by using a first state and a second state;
- wherein, when the output current increases from a first current value to a second current value, the voltage converting controller starts a transient reaction period and sets the control frequency to a maximum frequency value; and when the transient reaction period ends, the voltage converting controller sets the control frequency to a target control frequency corresponding to the second current value.

6. The switching voltage converting circuit as claimed in claim 5, wherein, when the output current increases from a first current value to a second current value, the voltage converting controller starts a dynamic reaction period and sets the secondary-side output voltage to an transient output value; and when the dynamic reaction period ends, the voltage converting controller sets a steady state value of the secondary-side output voltage to an output voltage steady state value corresponding to the second current value.

7. The switching voltage converting circuit as claimed in claim 6, wherein, the switching voltage converting circuit further comprises a conducting wire, one end of the conducting wire is coupled to the secondary-side output terminal, and the other end of the conducting wire is a conducting wire output end and has a conducting wire output voltage; and the voltage converting controller further comprises a conducting wire compensation unit, for maintaining a steady state value of the conducting wire output voltage at a fixed value by controlling the steady state value of the secondary-side output voltage, and when the voltage converting controller is in the dynamic reaction period, the voltage converting controller turns off a function of the conducting wire compensation unit.

8. The switching voltage converting circuit as claimed in claim 5, wherein, the switching voltage converting circuit has a primary-side regulation configuration.

9. A control method for voltage converting, applied to a switching voltage converting circuit, wherein the switching voltage converting circuit converts an input voltage into a regulated secondary-side output voltage, and a voltage converting controller generates a control signal, and the control signal has a variable control frequency to separately and periodically control a switch to be turned on or off by using a first state and a second state, and the control method comprises the following steps:
- detecting an output current of the switching voltage converting circuit;
- when the output current of the switching voltage converting circuit increases from a first current value to a second current value, the voltage converting controller starts a transient reaction period, and setting the control frequency to a maximum frequency value; and
- when the transient reaction period ends, setting the control frequency to an output control frequency corresponding to the second current value.

10. The control method for voltage converting as claimed in claim 9, further comprising:
- when the output current of the switching voltage converting circuit increases from a first current value to a second current value, starting a dynamic reaction period; and setting the secondary-side output voltage to a transient output value; and
- when the dynamic reaction period ends, setting a steady state value of the secondary-side output voltage to an output voltage steady state value corresponding to the second current value.

11. The control method for voltage converting as claimed in claim 9, wherein, the switching voltage converting circuit has a primary-side regulation configuration.

* * * * *